United States Patent Office 3,814,743
Patented June 4, 1974

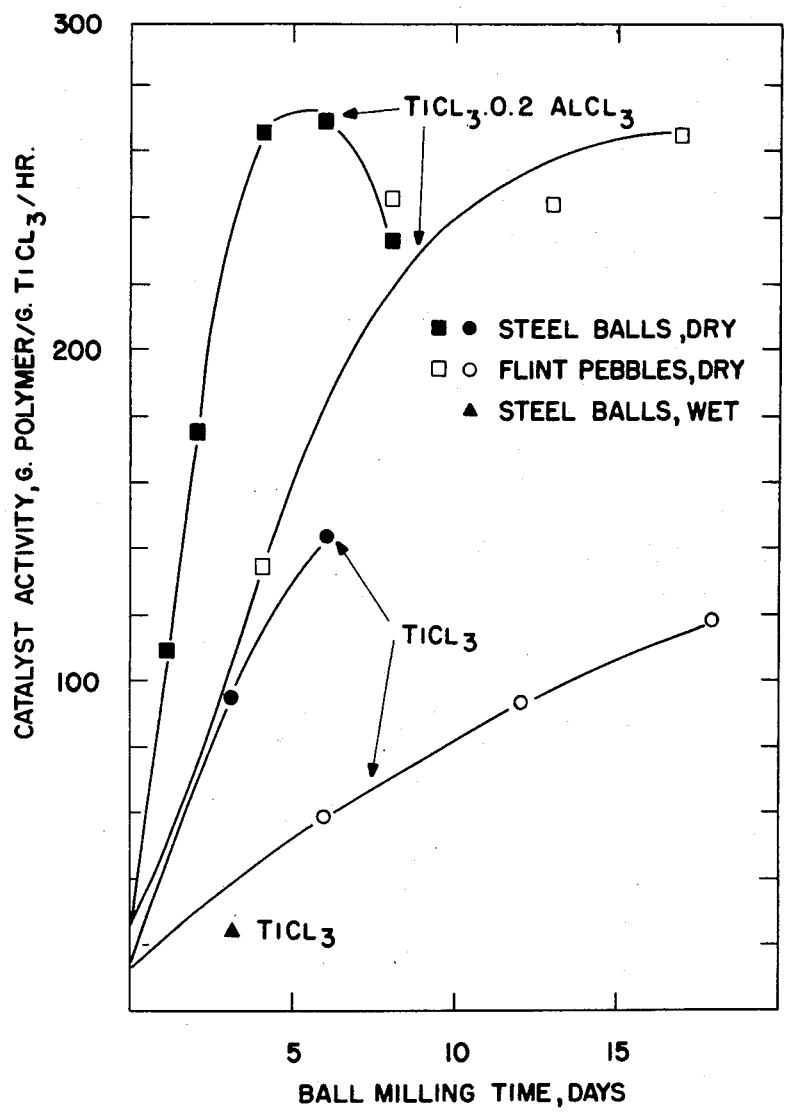

3,814,743
PROCESS FOR POLYMERIZING
ALPHA-OLEFINS
Erik Tornqvist, Roselle, and Arthur W. Langer, Jr., Watchung, N.J., assignors to Esso Research and Engineering Company
Continuation of abandoned application Ser. No. 151,522, Nov. 10, 1961, which is a division of application Ser. No. 745,124, June 27, 1958, now Patent No. 3,032,510. This application Nov. 13, 1964, Ser. No. 412,287
Int. Cl. C08f 1/42, 3/10
U.S. Cl. 260—93.7  14 Claims

ABSTRACT OF THE DISCLOSURE

High polymerization rates for alpha-olefins are obtained by dry milling a preformed partially reduced transition metal halide alone or cocrystallized with a Group II or III metal halide prior to activation with an organometallic compound. Examples of the transition metal halide are purple crystalline titanium trichloride and purple crystalline titanium trichloride cocrystallized with aluminum trichloride.

This application is a continuation of Ser. No. 151,522, filed Nov. 10, 1961, and now abandoned, which is a division of Ser. No. 745,124, filed June 27, 1958, now Pat. No. 3,032,510.

This invention relates to polymerization catalysts and more particularly to polymerization catalysts useful for the low pressure polymerization and copolymerization of alpha olefins.

Prior to the present invention, it was found that ethylene and other olefins such as propylene, butylene, isobutylene and the like can be polymerized and copolymerized at relatively low pressures not substantially exceeding atmospheric pressure in a liquid reaction medium when using various combinations of reducing metals or metal compounds, e.g. alkali and alkaline earth metals, their hydrides and alloys; aluminum compounds, such as aluminum hydrides, aluminum alkyls, e.g. aluminum trialkyls, alkyl aluminum halides and the like with various reducible heavy metal compounds, such as the halides, acetyl acetonates, and the like of the metals of Groups IV through VI and VIII of the Periodic Table, e.g. of titanium, zirconium, vanadium, chromium, molybdenum and iron. See, e.g., Belgian Pat. 533,362; "Chemical and Engineering News," Apr. 8, 1957, pages 12 through 16, and "Petroelum Refiner," December 1956, pages 191 through 196.

Prior to the present invention it was also discovered that isotactic polymers of alpha olefins containing more than two carbon atoms, such as for example propylene, butene-1, octene-1 and the like can be prepared in varying yields by polymerizing the desired olefin feed with a catalyst system made up of a preformed partially reduced transition metal halide alone or cocrystallized with a Group II or III metal halide which is activated with an organo-metallic compound. The use of these catalysts usually resulted in the formation of products of high crystallinity but only at relatively low rates unless very exacting polymerization conditions were observed.

It has now been found that when a preformed partially reduced transition metal halide alone or cocrystallized with a Group II or III metal halide is dry milled prior to activation with an organo-metallic compound, very high polymerization rates, high polymer crystallinity, and essentially no reactor fouling are obtained when these catalysts are used to polymerize alpha olefins containing more than two carbon atoms. Also, it was found that the dry milled preformed catalysts of the invention have high reactivity for all alpha olefins so that the copolymerization of alpha olefins can be carried out with very high copolymerization rates and high catalyst stability.

It was also known prior to the present invention that small increases in polymerization reaction rate were obtained with these preformed metal halides when they were ball-milled or pebble-milled in an inert diluent such as hexane or xylene. However, the ball-milling of these metal halides in inert diluents prior to activation with an organo-metallic compound produced relatively small increases in polymerization reaction rates, far below the surprisingly high reaction rates obtained when these metal halides were dry ball-milled prior to activation in accordance with the invention. The attached figure is a plot of the polymerization activity of the dry milled catalyst components of the invention and the best literature value of a wet milled catalyst.

The partially reduced transition metal halides that are dry ball-milled prior to activation with an organo-metallic compound are the halides, preferably the chlorides, of the transition metals of the IV, V VI and VIII groups of the Periodic System, such as titanium, zirconium, thorium, vanadium, tantalum, chromium, molybdenum and tungsten. The term "partially reduced" transition metal halides is to be understood to mean transition metal halides, the transition metal components of which have a valence at least one unit below their normal maximum valence. The Group II or III metal halide cocrystallized with the preformed partially reduced transition metal halide is preferably a chloride such as aluminum chloride, zinc chloride and the like. Titanium trichloride is preferred herein, especially the purple crystalline modification, and purple crystalline titanium trichloride cocrystallized with aluminum chloride is particularly preferred. When a partially reduced transition metal halide cocrystallized with a Group II or III metal halide is used, it contains from 0.05 to 1.0, preferably 0.1 to 0.5 mole of the Group II or III metal halide per mole of partially reduced transition metal halide. The partially reduced heavy transition metal halides can be prepared by any procedure known to the art and the preparation of these compounds is not within the scope of the invention. However, some of the methods known for preparing the preferred metal halides, i.e. purple crystalline titanium trichloride and purple crystalline titanium trichloride cocrystallized with aluminum chloride are summarized below:

(1) Reduction of titanium tetrachloride with aluminum powder in aromatic diluents at 100–175° C. at atmospheric pressure.

(2) Metal reduction of titanium tetrachloride with aluminum powder, titanium powder, or mixtures of aluminum and titanium powder in the absence of solvent at elevated temperatures.

(3) Hydrogen reduction of titanium tetrachloride at temperatures above about 650° C.

(4) Reduction of titanium tetrachloride with metal alkyls, AlEt$_3$ in particular, in an inert diluent above about 100° C.

(5) Heating a mixture of titanium tetrachloride and an aluminum alkyl, after the formation of a brown precipitate at a temperature above about 70° C. in the presence of an inert diluent.

(6) Reduction of titanium tetrachloride with an aluminum trialkyl by carrying out the reduction in temperature graded stages in an inert diluent and with an aluminum trialkyl/TiCl$_4$ mole ratio of about 0.3/1.

It is to be understood that the term "preformed partially reduced transition metal halide" as used hereafter means either a preformed partially reduced transition metal halide alone or cocrystallized with a Group II or III metal halide.

The dry milling process is carried out by placing the dry preformed partially reduced transition metal halide in ball milling or pebble milling equipment and milling the metal halide in the absence of diluents in an inert atmosphere, such as a nitrogen or argon atmosphere, which is free of oxygen, water vapor, and other catalyst poisons for a period of time sufficient to substantially increase the activity of the halide in the polymerization reaction when activated with an organo-metallic compound. It was found, however, that the use of steel balls was 3 to 5 times as effective as the use of flint pebbles and hence is the preferred embodiment of the invention. The optimum time period for the dry milling step depends in general on the efficiency of the equipment used and the particular preformed partially reduced transition metal halide used. Ball milling times of from about 1 to 15 days were used herein. The time period most suitable for any given milling equipment can easily be determined by routine experimentation. It should be noted that other grinding techniques such as colloid milling and fluid energy milling were tried with very little resulting increase in catalyst activity.

The surface area of several ball milled fractions of reduced titanium chloride catalyst components was measured using the standard technique of absorbing nitrogen at liquid nitrogen temperature. The measurements revealed that although the surface area increases appreciably, particularly during the early stages of milling, this increase is not great enough to account for the tremendous increases obtained in catalyst activity. X-ray diffraction studies of several dry milled preformed partially reduced transition metal halides revealed that the dry ball-milling step caused marked changes in their crystal structure as evidenced by an almost complete disappearance of all diffraction peaks. Hence, it appears that the large increase in catalyst activity obtained with the dry milled preformed metal halides is due to changes in the crystal structure of the metal halides rather than a mere increase in surface area. However, this invention is of course not limited to any particular explanation of the surprising advantages obtained.

The dry milled preformed partially reduced transition metal halides are removed from the milling equipment at the end of the milling period and activated with an organo-metallic compound in an inert diluent. The organo-metallic compounds useful in the present invention for activating the dry milled metal halides are organo-metallic compounds of the metals of Groups I to III of the Periodic System. Particularly valuable are alkyl aluminum compounds, especially trialkyl aluminum compounds such as tirethyl aluminum, tripropyl aluminum, triisobutyl aluminum, and the like, and dialkyl aluminum compounds such as diethyl aluminum halides, e.g. diethyl aluminum chloride, dipropyl aluminum chloride, diisobutyl aluminum chloride, and the like. Monoalkyl aluminum halides can also be used. Additionally, organo-aluminum compounds having one or two hydrocarbon radicals and two or one electron attracting groups such as alkoxy, organic nitrogen or sulfur groups can also be used. Triethyl aluminum is particularly preferred herein.

The dry milled metal halide is treated in a non-oxidizing atmosphere in an inert diluent with one or more of the above organo-metallic compounds in a mole ratio of 0.1 to 6 mols of organo-metallic compound per mole of dry milled metal halide at a temperature in the range of 25° to 135° C. The temperature is not critical here although elevated temperatures which will result in decompositions of either or both of the components should, of course, not be used.

The inert diluents suitable as a medium for the activation of the dry milled metal halides include aliphatic hydrocarbons such as n-hexane, n-heptane and n-decane and aromatic hydrocarbons such as benzene, toluene, xylene, halogenated hydrocarbons such as chlorobenzene, and the like, with an aromatic diluent, particularly xylene, being preferred.

The dry milled preformed partially reduced transition metal halide after being activated with an organo-metallic compound is used to homopolymerize alpha olefins containing more than two carbon atoms and to copolymerize alpha olefins such as ethylene and propylene. The homopolymerization of alpha olefins such as for example propylene, butene-1, heptene-1, dodecene-1, and the like and the copolymerization of two or more alpha olefins such as mixtures of ethylene and propylene, ethylene and butene-1, propylene and butene-1, and the like, is carried out by contacting the desired olefin feed with the activated dry milled metal halide in a hydrocarbon solvent at a temperature of from 0° to about 100° C., preferably 70° to 85° C., and at pressures ranging from subatmospheric to 150 p.s.i.g., preferably atmospheric pressure, in batch or continuous operation. The catalyst slurry is preferably diluted with additional diluent to provide a catalyst concentration for the polymerization of about 0.1 to 0.5 weight percent based on the weight of the diluent present. The polymer product concentration in the polymerization reaction mixture can range between about 1 to 20 weight percent based on the total contents present. It should be noted that the polymerization process of this invention allows the use of more concentrated polymer slurries than are recommended in prior art processes. When the desired degree of polymerization has been obtained, a $C_1$ to $C_8$ alkanol such as isopropyl alcohol or n-butyl alcohol, desirably in combination with a chelating agent such as acetyl acetone or diacetyl, is added to the reaction mixture to dissolve and deactivate the catalyst and to precipitate the polymer product from solution. The polymer product is then filtered and can be further washed with alcohol or an acid such as hydrochloric acid and dried, compacted and packaged. It is important that the polymerization reaction be carried out in the absence of catalyst poisons such as water, oxygen, sulfur compounds, and the like. The activated dry milled metal halide catalyst of the invention can be added to the olefin-saturated diluents at polymerization temperature without encountering reactor fouling. This is surprising and is of particular importance in continuous polymerization reactions where a direct addition of catalyst to the reactor at polymerization temperatures is highly advantageous.

The invention will be better understood from the following examples.

EXAMPLE I

A TiCl$_3$ catalyst component which had been prepared by the reduction of TiCl$_4$ with hydrogen at about 700° C. was divided into two parts and one part ball milled for three days with chrome alloy steel balls in a quart jar. A second portion was similarly ball milled for six days. Then 0.386 grams of each portion of the ball-milled TiCl₃ was placed separately in 100 mls. of xylene and each activated with 0.57 g. of AlEt₅. Thereafter, additional xylene was addded to each to give a catalyst concentration of 0.95 g. per liter and propylene gas bubbled through each xylene-catalyst slurry by means of a dip tube for one hour at 75° C. The ball milling conditions, catalyst composition, reaction conditions and the results obtained for the polymerization reactions are given in Table I.

EXAMPLE II

A TiCl₃–0.33 AlCl₃ catalyst component was prepared by the reduction of TiCl₄ with the stoichiometric amount of aluminum powder at 230° C. in a steel bomb. This polymerize propylene and the details of this run are given in Table I.

EXAMPLE V

An AlEt₃ activated TiCl₃–0.33 AlCl₃ catalyst was prepared according to the process of Example II except that the ball milling operation was carried out in n-heptane diluent. The details of this run are given in Table I for comparison purposes.

EXAMPLES VI AND VII

An AlEt₃ activated TiCl₃–0.2 AlCl₃ catalyst was prepared according to the process of Example III except that in Example VI the catalyst was not ball-milled prior to activation with AlEt₃ and in Example VII the catalyst was flint pebble-milled for nine days prior to activation with AlEt₃. The details of these runs are given in Table I.

TABLE I

| | I | II | III | IV | V | VI | VII |
|---|---|---|---|---|---|---|---|
| Milling conditions: | | | | | | | |
| Type | Steel balls | Steel balls | Steel balls | Steel balls | Flint pebbles | Steel balls | Flint pebbles |
| Diluent | None | None | None | None | None | n-Heptane | None |
| Time, days | 3 | 6 | 4 | 4 | 4 | 4 | 0 | 9 |
| Catalyst composition: | | | | | | | |
| Type | TiCl₃ | TiCl₃ | TiCl₃–0.33 AlCl₃ | TiCl₃–0.2 AlCl₃ | TiCl₃–0.2 AlCl₃ | TiCl₃–0.33 AlCl₃ | TiCl₃–0.2 AlCl₃ | TiCl₃–0.2 AlCl₃ |
| Weight, grams | 0.386 | 0.386 | 0.5 | 0.45 | 0.45 | 0.5 | 0.90 | 0.45 |
| AlEt₃, g | 0.57 | 0.57 | 0.48 | 0.5 | 0.5 | 0.48 | 1.02 | 0.51 |
| Al/Ti mol. ratio | 2 | 2 | 2 | 2 | 2 | 2 | 2 | 2 |
| Reaction conditions: | | | | | | | |
| Olefin | Propylene | Propylene | Propylene | Propylene | Propylene | Propylene | Propylene | Propylene |
| Diluent [a] | Xylene | Xylene | Xylene | Xylene | Xylene | Xylene | Xylene | Xylene |
| Temperature, °C | 75 | 75 | 75 | 75 | 75 | 75 | 75 | 75 |
| Run length, hrs | 1 | 1 | 1 | 1 | 1 | 1 | 2 | 2 |
| Catalyst conc. g./l | 0.95 | 0.95 | 0.98 | 0.96 | 0.96 | 0.98 | 1.92 | 0.96 |
| Results: | | | | | | | |
| Yield, g | 36.9 | 52.8 | 111.3 | 98.8 | 50.3 | 10.4 | 18.6 | 169. |
| Waxy polymer, percent | 7.6 | 6.6 | 5.4 | 4.4 | 4.8 | 6.2 | 12.3 | 1.2. |
| Catalyst efficiency g./g | 38.8 | 55.5 | 116 | 103 | 52.2 | 10.6 | 9.7 | 176. |
| Properties of solid polymer: | | | | | | | |
| Molecular wt. ×10⁻³ [b] | 190 | 155 | 165 | 190 | 178 | 170 | 118 | 157. |
| Density g./ml | 0.902 | 0.900 | 0.900 | 0.898 | 0.901 | | | |
| Softening pt. °C | 163 | 160 | 160 | 155 | 162 | 161 | | 145. |
| Melting pt. °C | 168 | 168 | 168 | 163 | 167 | 169 | | 163. |
| Tensile strength, p.s.i. | 5,500 | 4,780 | 4,600 | 4,500 | 4,970 | | | 4,910. |
| Elongation, percent | 70 | 160 | 150 | 230 | 140 | | | 30. |
| Ash, percent | 0.022 | 0.024 | 0.013 | 0.013 | 0.030 | | 0.156 | 0.001. |

[a] 1 liter.
[b] Determined according to the Harris relation for polyethylene (J. Polym. Sci., 8, 361 (1952)).

catalyst component was dry ball-milled with chrome alloy steel balls for 4 days in a quart jar at room temperature under a nitrogen atmosphere. The dry ball milled catalyst component was then placed in 100 ml. of xylene and activated with 0.48 g. of AlEt₃. Propylene was then polymerized with this catalyst preparation following the procedure of Example I. The details of preparation and the results obtained are given in Table I.

EXAMPLE III

A TiCl₃–0.2 AlCl₃ catalyst component was prepared by the reduction of TiCl₄ with stoichiometric quantities of titanium and aluminum powders according to the formula:

$$9TiCl_4 + Ti + 2Al = 10TiCl_3 \cdot 2AlCl_3.$$

The reduction was carried out in a steel bomb at 240° C. The reduction product was then ball milled as in Example II. Thereafter AlEt₃ was added and the resulting catalyst used to polymerize propylene following the procedure of Example I. The milling conditions, catalyst composition, reaction conditions and results obtained are given in Table I for comparison purposes.

EXAMPLE IV

An AlEt₃ activated TiCl₃–0.2 AlCl₃ catalyst was prepared according to the process of Example III except that flint pebbles were used instead of steel balls for the milling operation. This catalyst was then used to It can be seen from the above table that TiCl₃ and TiCl₃·xAlCl₃ catalyst components when ball-milled or pebble-milled give high catalyst efficiencies and low percentages of waxy polymer. It can be seen, however, from a comparison of Examples III and IV that ball milling with steel balls is preferable to the use of flint pebbles in the milling apparatus. The outstanding and surprising advantages of dry ball milling compared to ball milling in the presence of a diluent can be appreciated by comparing Examples II and V. An increase in catalyst efficiency of greater than 10-fold was obtained by dry ball milling (Example II). Also, a comparison between Examples VI and VII, the former carried out without ball milling, shows the surprising advantages obtained by dry ball milling the preformed catalyst prior to activation in that the percentage of waxy polymer obtained with the catalyst of Example VI which was not ball milled is more than ten times the percentage of waxy polymer obtained in Example VII with the ball milled catalyst. Also the catalyst efficiency of the catalyst of Example VII is over eighteen times the efficiency of the non-ball milled catalyst of Example VI.

EXAMPLE VIII

A TiCl₃·0.2AlCl₃ catalyst component was prepared according to the process of Example III and then milled in a porcelain jar using flint pebbles as the grinding medium. Samples were taken at intervals between 2 and 21 days, activated with AlEt$_3$ and used to polymerize propylene. The results obtained are shown in Table II. The surface area of the dry ball-milled TiCl$_3$.0.2AlCl$_3$ components is also given in Table II.

EXAMPLE IX

A TiCl$_3$–0.2AlCl$_3$ catalyst component was prepared according to the process of Example III, divided into portions, and each portion dry milled with either flint pebbles or chrome alloy steel balls for various periods of time. Thereafter, each sample was activated with AlEt$_3$ and used to polymerize propylene. The details of catalyst preparation, polymerization reactions, and the results obtained therefrom are given in Table III.

EXAMPLE X

A TiCl$_3$ catalyst component was prepared according to the process of Example I except that it was pebble-milled for various periods of time instead of ball milled, and thereafter activated with AlEt$_3$ and used to polymerize propylene according to the process of Example I using the portions of ingredients and reaction conditions shown in Table III. The results obtained are also given in Table III.

TABLE II.—EXAMPLE VIII

| Milling conditions: | | | | | | |
|---|---|---|---|---|---|---|
| Type | | Flint pebbles | Flint pebbles | Flint pebbles | Flint pebbles | Flint pebbles. |
| Diluent | | None | None | None | None | None. |
| Time, days | 0 | 2 | 6 | 9 | 13 | 21. |
| Catalyst composition: | | | | | | |
| Type | {TiCl$_3$-0.2 / AlCl$_3$} | TiCl$_3$-0.2 AlCl$_3$ | TiCl$_3$-0.2 AlCl$_3$ | TiCl$_3$-0.2 AlCl$_3$ | TiCl$_3$-0.2 AlCl$_3$ | TiCl$_3$-0.2. AlCl$_3$. |
| Weight, grams | 0.90 | 0.90 | 0.45 | 0.45 | 0.45 | 0.45. |
| AlEt$_3$, g | 1.02 | 1.02 | 0.51 | 0.51 | 0.51 | 0.51. |
| Al/Ti mol. ratio | 2 | 2 | 2 | 2 | 2 | 2. |
| Surface Area, m.$^2$/g.[a] | 2.5 | 5.6 | 35 | 16.5 | 14.5 | 29. |
| Reaction conditions: | | | | | | |
| Olefin | Propylene | Propylene | Propylene | Propylene | Propylene | Propylene. |
| Diluent[2] | Xylene | Xylene | Xylene | Xylene | Xylene | Xylene. |
| Temperature, °C | 75 | 75 | 75 | 75 | 75 | 75. |
| Run length, hrs | 2 | 2 | 2 | 2 | 2 | 2. |
| Catalyst con. g./l | 1.92 | 1.92 | 0.96 | 0.96 | 0.96 | 0.96. |
| Results: | | | | | | |
| Yield, g | 18.6 | 47.5 | 138 | 169 | 156 | 111. |
| Waxy polymer, percent | 12.3 | 4.2 | 0.8 | 1.2 | 0.5 | 1.8. |
| Catalyst efficiency g./g. | 9.7 | 24.6 | 144 | 176 | 162 | 106. |
| Properties of solid polymer: | | | | | | |
| Molecular wt. ×10$^{-3}$ | 118 | 167 | 195 | 157 | 172 | 135. |
| Softening pt., °C | | 157 | 151 | 145 | 136 | 143. |
| Melting pt., °C | | 162 | 163 | 163 | 162 | 160. |
| Tensile strength, p.s.i | | 4,980 | 4,830 | 4,910 | 4,660 | 4,360. |
| Elongation, percent | | 40 | 50 | 30 | 30 | 80. |
| Ash, percent | 0.156 | 0.051 | 0.017 | 0.001 | 0.001 | 0.021. |

[a] Average of 2 determinations. [b] 1 liter.

It can be seen from the above table that there is an optimum ball milling time for the preformed partially reduced transition metal halides beyond which activity starts to decrease. A ball milling time of 9 days for the particular catalyst component employed resulted in maximum catalyst efficiency. Hence, it can be seen that the optimum milling time for a particular catalyst and for the particular milling equipment used can easily be determined by routine experimentation.

It is interesting to note that the most active catalyst component, i.e., the sample pebble milled 9 days, had a surface area of only 16.5 m.$^2$/g. compared to the less active sample pebble milled 21 days which had a much higher surface area (29 m.$^2$/g.). Hence, as stated previously, the increased activity obtained by dry milling is clearly not due solely to increased surface area.

TABLE III

| Milling conditions: | | | | | | |
|---|---|---|---|---|---|---|
| Type | Steel balls | Steel balls | Steel balls | Steel balls | Steel balls | Flint pebbles. |
| Diluent | None | None | None | None | None | None. |
| Time, days | 1 | 2 | 4 | 6 | 8 | 4. |
| Catalyst composition: | | | | | | |
| Type | {TiCl$_3$-0.2 / AlCl$_3$} | TiCl$_3$-0.2 AlCl$_3$ | TiCl$_3$-0.2 AlCl$_3$ | TiCl$_3$-0.2 AlCl$_3$ | TiCl$_3$-0.2 AlCl$_3$ | TiCl$_3$-0.2. AlCl$_3$. |
| Weight, grams | 0.45 | 0.45 | 0.45 | 0.45 | 0.45 | 0.45. |
| AlEt$_3$, g | 0.5 | 0.5 | 0.5 | 0.5 | 0.5 | 0.5. |
| Al/Ti mol. ratio | 2 | 2 | 2 | 2 | 2 | 2. |
| Reaction conditions: | | | | | | |
| Olefin | Propylene | Propylene | Propylene | Propylene | Propylene | Propylene. |
| Diluent[a] | Xylene | Xylene | Xylene | Xylene | Xylene | Xylene. |
| Temperature, °C | 75 | 75 | 75 | 75 | 75 | 75. |
| Run length, hrs | 1 | 1 | 1 | 1 | 1 | 1. |
| Catalyst conc. g./l | 0.96 | 0.96 | 0.96 | 0.96 | 0.96 | 0.96. |
| Results: | | | | | | |
| Yield, g | 40.7 | 65.3 | 98.8 | 99.6 | 87.9 | 50.3. |
| Waxy polymer, percent | 6.1 | 6.9 | 4.4 | 4.5 | 5.7 | 4.8. |
| Catalyst efficiency, g. polymer/g. TiCl$_3$ | 105 | 176 | 267 | 270 | 234 | 135. |
| Properties of solid polymer: | | | | | | |
| Molecular wt. ×10$^{-3}$ [b] | 158 | 225 | 190 | 175 | 145 | 178. |
| Density, g./ml | 0.899 | 0.899 | 0.898 | 0.900 | 0.898 | 0.901. |
| Softening pt. °C | 158 | 158 | 155 | 158 | 155 | 162. |
| Melting pt. °C | 165 | 165 | 163 | 165 | 168 | 167. |
| Tensile strength, p.s.i | 4,610 | 4,760 | 4,490 | 4,343 | 4,450 | 4,970. |
| Elongation, percent | 140 | 90 | 230 | 370 | 200 | 140. |
| Ash, percent | 0.034 | 0.021 | 0.013 | 0.019 | 0.023 | 0.030. |

TABLE III—Continued

|  | Example IX |  |  |  |  | Example X |
|---|---|---|---|---|---|---|
| Milling conditions: |  |  |  |  |  |  |
| Type | Flint pebbles | Flint pebbles | Flint pebbles | Flint pebbles | Flint pebbles | Flint pebbles. |
| Diluent | None | None | None | None | None | None. |
| Time, days | 8 | 13 | 17 | 6 | 12 | 18. |
| Catalyst composition: |  |  |  |  |  |  |
| Type | {TiCl$_3$-0.2 / AlCl$_3$} | TiCl$_3$-0.2 / AlCl$_3$ | TiDl$_3$-0.2 / AlCl$_3$ | TiCl$_3$ | TiCl$_3$ | TiCl$_3$. |
| Weight, grams | 0.45 | 0.45 | 0.45 | 0.386 | 0.386 | 0.386. |
| AlEt$_3$, g | 0.5 | 0.5 | 0.5 | 0.5 | 0.5 | 0.5. |
| Al/Ti mol. ratio | 2 | 2 | 2 | 2 | 2 | 2. |
| Reaction conditions: |  |  |  |  |  |  |
| Olefin | Propylene | Peopylene | Propylene | Propylene | Propylene | Propylene. |
| Diluent [a] | Xylene | Xylene | Xylene | Xylene | Xylene | Xylene. |
| Temperature, °C | 75 | 75 | 75 | 75 | 75 | 75. |
| Run length, hrs | 1 | 1 | 1 | 1 | 1 | 1. |
| Catalyst, conc. g./l | 0.96 | 0.96 | 0.96 | 0.96 | 0.95 | 0.95. |
| Results: |  |  |  |  |  |  |
| Yield, g | 92.0 | 91.6 | 99.3 | 21.5 | 34.0 | 43.3. |
| Waxy polymer, percent | 4.7 | 4.4 | 4.5 | 7.5 | 6.2 | 6.9. |
| Catalyst efficiency, g. polymer/g. TiCl$_3$ | 248 | 246 | 267 | 58.5 | 92.7 | 118. |
| Properties of solid polymer: |  |  |  |  |  |  |
| Molecular wt. $\times 10^{-3}$ [b] | 215 | 158 | 125 | 213 | 164 | 200. |
| Density, g./ml | 0.900 | 0.898 | 0.899 | 0.901 | 0.901 | 0.900. |
| Softening pt. °C | 160 | 157 | 158 | 160 | 162 | 158. |
| Melting pt. °C | 166 | 168 | 168 | 168 | 170 | 166. |
| Tensile strength, p.s.i. | 4,400 | 4,420 | 4,780 | 4,860 | 4,840 | 4,570. |
| Elongation, percent | 80 | 180 | 290 | 140 | 550 | 200. |
| Ash, percent | 0.013 | 0.018 | 0.025 | 0.039 | 0.001 | 0.032. |

[a] 1 liter.
[b] Determined according to the Harris relation for polyethylene (J. Polym. Sci., s, 561 (1952)).

It can be seen from Table III that the grinding efficiency of steel balls is from 3 to 5 times as great as that of flint pebbles. It can also be seen from this table that the polymerization results obtained with the TiCl$_3$–0.2 AlCl$_3$ catalyst components were superior to those obtained with pure TiCl$_3$. Also, TiCl$_3$–0.2 AlCl$_3$ catalyst components not only give the highest polymerization rates but acquire these rates after relatively short dry milling times. The catalyst activities vs. the ball milling times, both of which are taken from Table III, are plotted in the attached figure together with the dry ball milled TiCl$_3$ catalyst of Example I. A literature value for wet milled TiCl$_3$ is also given in the figure for comparison purposes. This wet milled TiCl$_3$ sample is the best literature data available and represents a TiCl$_3$ sample which was steel ball milled for 72 hours in dry n-heptane containing AlEt$_3$ at an AlEt$_3$/TiCl$_3$ ratio of 0.1 (Natta G., Pasquon, I., and Giachetti, E., La Chimica E. L'Industria, 39, 102 (1957)). The outstanding superiority of the dry milling process of the invention can readily be seen from this figure.

EXAMPLE XI

Two of the ball milled TiCl$_3$–0.2 AlCl$_3$ components of Example VIII were activated with AlEt$_3$ and used to polymerize butene-1, hexene-1, heptene-1, octene-1, decene-1, hexadecene-1 and octadecene-1. The polymerization reaction were carried out according to the process of Example I except that liquid monomers were added slowly from an addition funnel instead of being introduced through a dip tube used for propylene and other gaseous monomers. The details of these runs are given in Table IV.

It can be be seen from the above table that the ball milled catalyst of the invention can sucessfully be used to polymerize alpha olefins having more than 3 carbon atoms.

EXAMPLE XII

A TiCl$_3$–0.2 AlCl$_3$ catalyst component was prepared according to the process of Example III and dry ball milled with chrome alloy steel balls for five days. 1.35 grams of the ball milled catalyst component was then slurried in 250 ml. of chlorobenzene at 25° C. and 1.16 grams of AlEt$_3$ was added thereto giving a catalyst concentration of 10 grams per liter and an AlEt$_3$/TiCl$_3$ mole ratio of 1.34. Additional chlorobenzene was then added to give a catalyst concentration of 0.84 grams per liter, i.e., a total of 2.51 grams of catalyst in 3 liters of chlorobenzene. A 50 volume percent ethylene-50 volume percent propylene gaseous feed was then introduced into the chlorobenzene at about 70° C. for one hour. Thereafter, 150 mls. of a mixture containing 90% dry methanol and 10% concentrated hydrochloric acid was carefully added with stirring to deactivate and dissolve the catalyst. The methanol-hydrochloric acid phase was then withdrawn and the copolymer product precipitated by the addition of an equal volume of dry methanol. The precipitated copolymer was then filtered and washed with thorough kneading with several portions of dry methanol. The precipitated copolymer was then kneaded with acetone, banded on a hot rubber mill to remove excess diluents, compacted and dried. 212 grams of an ethylene-propylene copolymer was obtained, corresponding to a catalyst efficiency of 84.5 g./g. The molecular weight of the copolymer was 80,000.

TABLE IV.—EXAMPLE XI

| Milling conditions: |  |  |  |  |  |  |  |
|---|---|---|---|---|---|---|---|
| Type | Flint pebbles | Flint pebbles | Flint pebbles | Flint pebbles | Flint pebbles | Flint pebbles | Flint pebbles. |
| Diluent | None | None | None | None | None | None | None. |
| Time, days | 13 | 13 | 13 | 21 | 21 | 21 | 21. |
| Catalyst composition: |  |  |  |  |  |  |  |
| Type | {TiCl$_3$-0.2 / AlCl$_3$} | TiCl$_3$-0.2 / AlCl$_3$ | TiCl$_3$-0.2 / AlCl$_3$ | TiCl$_3$-0.2 / AlCl$_3$ | TiCl$_3$-0.2 / AlCl$_3$ | TiCl$_3$-0.2 / AlCl$_3$ | TiCl$_3$-0.2 / AlCl$_3$. |
| Weight, grams | 0.45 | 0.45 | 0.45 | 0.45 | 0.45 | 0.45 | 0.45. |
| AlEt$_3$, g | 0.51 | 0.51 | 0.51 | 0.51 | 0.51 | 0.51 | 0.51. |
| Al/Ti mol. ratio | 2 | 2 | 2 | 2 | 2 | 2 | 2. |
| Reaction conditions: |  |  |  |  |  |  |  |
| Olefin | Butene-1 | Hexene-1 | Heptene-1 | Octene-1 | Decene-1 | Hexadecene-1 | Octadecene-1. |
| Diluent [a] | Xylene | Xylene | Xylene | Xylene | Xylene | Xylene | Xylene. |
| Temperature, °C | 75 | 75 | 75 | 100 | 100 | 60 | 100. |
| Run length, hrs | 2 | 2 | 2 | 1 | 2 | 2 | 2. |
| Catalyst conc. g./l | 0.85 | 0.85 | 0.96 | 0.96 | 0.96 | 0.96 | 0.96. |
| Results: |  |  |  |  |  |  |  |
| Yield, g | 104.4 | 127.4 | 24.1 | 45.1 | 30.3 | 13.5 | 19.7. |
| Waxy polymer, percent | 1.3 | 0.24 | 10.9 | 6.3 | 1 | 2.8 |  |
| Catalyst efficiency, g./g. | 109 | 133 | 25.1 | 47.0 | 31.5 | 14.1 | 20.5. |
| Properties of solid polymer: |  |  |  |  |  |  |  |
| molecular wt. $\times 10^{-3}$ [b] | 155 | 137 | 71 | 106 | 51 | 73 | 21.5. |

[a] 1 liter.
[b] Determined according to the Harris relation for polyethylene (J. Polym. Sci., 8, 361 (1952)).

The above polymerization reaction was then repeated using the above conditions and components except that the TiCl$_3$–0.2 AlCl$_3$ catalyst component was not milled. Severe fouling was encountered as soon as the ethylene-propylene feed was introduced and only a few grams of a stringy polymer consisting primarily of polyethylene were obtained.

The above examples have been given for illustration purposes only and are not meant to limit the invention. Additionally, modifications can be made by those skilled in the art without departing from the scope and spirit of the invention.

What is claimed is:

1. A process for polymerizing olefins which comprises contacting under polymerization conditions a C$_3$ or higher alpha olefin feed with a catalyst comprising:
   (a) a titanium compound consisting essentially of a preformed, partially reduced purple titanium halide which has been dry milled for a time sufficient to cause marked changes in the crystal structure thereof as evidenced by an almost complete disappearance of all diffraction peaks, and
   (b) an alkyl aluminum compound.

2. The process of claim 1 wherein the alkyl aluminum compound is a trialkyl aluminum compound.

3. The process of claim 1 wherein the olefin is propylene.

4. The process of claim 1 wherein the alkyl aluminum compound is a diethyl aluminum halide.

5. The process of claim 1 wherein the dry milling is accomplished by dry ball milling the titanium halide for about 1 to 15 days.

6. The process of claim 5 wherein the alkyl aluminum compound is aluminum triethyl.

7. The process of claim 6 wherein the titanium halide is titanium trichloride.

8. The process of claim 7 wherein the titanium chloride is cocrystallized with aluminum trichloride.

9. The process of claim 8 wherein the olefin is propylene.

10. The process of claim 8 wherein 0.1 to 6 moles of the aluminum triethyl is used per mole of titanium chloride cocrystallized with aluminum chloride.

11. The process of claim 5 wherein the dry ball milling is accomplished in a steel ball mill.

12. The process of claim 1 wherein the titanium halide is titanium chloride.

13. The process of claim 12 wherein the titanium chloride is cocrystallized with aluminum chloride.

14. The process of claim 13 wherein the alkyl aluminum compound is diethyl aluminum chloride.

References Cited

UNITED STATES PATENTS

| | | | |
|---|---|---|---|
| 3,063,798 | 11/1962 | Langer et al. | 260—94.9 E |
| 3,121,063 | 2/1964 | Tornqvist | 260—94.9 E |
| 3,128,252 | 4/1964 | Tornqvist et al. | 260—94.9 E |
| 3,573,270 | 3/1971 | Trementozzi et al. | 260—94.9 E |

FOREIGN PATENTS

| | | |
|---|---|---|
| 850,910 | 10/1960 | Great Britain |
| 558,252 | 12/1957 | Belgium. |

JOSEPH L. SHOFER, Primary Examiner

E. J. SMITH, Assistant Examiner

U.S. Cl. X.R.

252—429 A, 429 C; 260—88.2 R, 94.9 B, 94.9 E